US005494502A

United States Patent [19]
DeLong

[11] Patent Number: 5,494,502
[45] Date of Patent: Feb. 27, 1996

[54] ASPHALT RELEASE AGENT

[75] Inventor: William M. DeLong, Aurora, Colo.

[73] Assignee: The ChemMark Corporation, Aurora, Colo.

[21] Appl. No.: 317,125

[22] Filed: Oct. 3, 1994

[51] Int. Cl.⁶ .................................................. C09D 191/00
[52] U.S. Cl. ........................ 106/2; 106/38.24; 106/38.7; 106/243; 106/244
[58] Field of Search .............................. 106/38.24, 38.7, 106/2, 243, 244; 427/421

[56] References Cited

U.S. PATENT DOCUMENTS

| | | | |
|---|---|---|---|
| 3,458,327 | 7/1969 | Fraser | 427/427 |
| 3,474,166 | 10/1969 | Babcock | 264/338 |
| 3,524,751 | 8/1970 | Smith et al. | 106/244 |
| 3,996,181 | 12/1976 | Hayashi et al. | 524/25 |
| 4,084,981 | 4/1978 | Higuchi et al. | 106/671 |
| 4,250,300 | 2/1981 | Saegusa et al. | 528/401 |
| 4,312,901 | 1/1982 | Kekish et al. | 106/13 |
| 4,350,723 | 9/1982 | Sugimura et al. | 428/42 |
| 4,362,639 | 12/1982 | Eoga | 252/99 |
| 4,447,500 | 5/1984 | Ferris | 427/417 |
| 4,534,794 | 8/1995 | Walter et al. | 106/14.05 |
| 4,728,446 | 3/1988 | Doty et al. | 507/277 |
| 4,741,844 | 5/1988 | Posey, Jr. | 507/254 |
| 4,780,150 | 10/1988 | Anderson et al. | 134/3 |
| 4,803,007 | 2/1989 | Garber | 252/70 |
| 4,849,171 | 7/1989 | Murray | 422/7 |
| 4,853,038 | 8/1989 | Leithaeuser et al. | 106/244 |
| 4,937,027 | 6/1990 | Oshio et al. | 264/133 |
| 4,937,033 | 6/1990 | Oshio et al. | 264/256 |
| 4,963,290 | 10/1990 | Bressan et al. | 252/387 |
| 5,133,804 | 7/1992 | Culpon, Jr. | 106/38.24 |
| 5,162,057 | 11/1992 | Akiyama et al. | 106/244 |
| 5,194,584 | 3/1993 | Leahy | 106/38.24 |
| 5,308,393 | 5/1994 | Hattich et al. | 106/38.24 |
| 5,322,554 | 6/1994 | Delong | 106/38.22 |
| 5,378,270 | 1/1995 | Takashima | 106/38.24 |

FOREIGN PATENT DOCUMENTS

| | | | |
|---|---|---|---|
| 1582466 | 9/1969 | France | 106/38.24 |
| 54-116018 | 9/1979 | Japan | 106/38.24 |
| 55-054775 | 3/1980 | Japan | 106/2 |

Primary Examiner—Anthony Green
Attorney, Agent, or Firm—Greenlee and Winner

[57] ABSTRACT

An asphalt release agent and a method of applying the same, wherein said asphalt release agent comprises a fatty oil as the active ingredient together with a foaming agent, a crosslinked copolymer, an alkalinizing agent and a preservative. The release agent is preferably applied using a pneumatic pump to pump the release agent through an air-inducting nozzle.

16 Claims, 1 Drawing Sheet

ASPHALT RELEASE AGENT

FIELD OF THE INVENTION

The present invention relates to the field of asphalt release agents for use in preventing asphaltic compounds such as road asphalt from sticking to equipment used to transport and work the asphalt such as truck beds and tools. In particular, the asphalt release agent of the present invention includes a fatty oil as the active ingredient and a surfactant or foaming agent to facilitate the application and distribution of the active ingredient.

BACKGROUND OF THE INVENTION

Most roads are paved with asphalt, which is produced at an asphalt plant and transported to the construction site in large truck beds such as dump trucks. A difficulty with the transportation operation is that the asphalt tends to stick on contact to any surface. The sticking of the asphalt to the surface of the truck bed prevents the asphalt from smoothly sliding out of the bed as the dump truck attempts to discharge its asphalt load. As a result, workers must coax the asphalt out of the bed using tools and/or environmentally hazardous chemicals. This sticking of the asphalt also affects other storage and transport vehicles such as drums, storage tanks, trailers and piping, as well as tools and other process equipment such as rollers (e.g., rubber-tired and steel-drum rollers), pavers and blades.

Asphalt release agents are known to prevent asphalt from sticking to metallic surfaces. A common release agent used in the past was a hydrocarbon fuel such as ordinary diesel fuel. Such fuels are extremely effective in cutting asphalt to prevent it from sticking. However, the reason for their effectiveness is that they combine with and dilute the asphalt. This impairs the structural integrity of the laid asphalt in the roadway. Also, excessive use of fuel as a release agent contaminates the ground beneath the truck. For these reasons, the Department of Transportation and many state highway departments have severely restricted the use of fuel as a release agent.

Other non-fuel-based asphalt release agents are known to the art. However, most of these other release agents suffer from some combination of being limited in their effectiveness, being environmentally dangerous or expensive. Most of these other release agents also suffer from their complexity in either the delivery, preparation or application steps of utilization. Importantly, existing release agents combine with the asphaltic material and thus are effective for only a single application.

Thus, a need exists for an asphalt release agent which is effective in preventing the sticking of asphalt to truck beds and other surfaces, innocuous and inexpensive, environmentally safe, long-lasting when coated on asphalt-contact surfaces, i.e. does not wash off into the asphaltic material, and does not dilute or otherwise compromise the quality of the asphalt.

SUMMARY OF THE INVENTION

The present invention is an asphalt release agent comprising a fatty oil as the active ingredient and a surfactant or foaming agent. In preferred modes of the invention, the active ingredient is a vegetable oil or combination of vegetable oils. A preferred surfactant or foaming agent is an anionic surfactant.

The release agent of the present invention is typically stored in bulk and can be applied to a truck bed or other surface by any means known to the art including, but not limited to, spraying, sponging, wiping, painting or dip-coating. The release agent can be mixed with pressurized air or passed through an air induction nozzle which facilitates spreading of the release agent by the surfactant. The use of a foam product makes the release agent easier to apply and more economical.

DETAILED DESCRIPTION OF THE INVENTION

Figure 1:
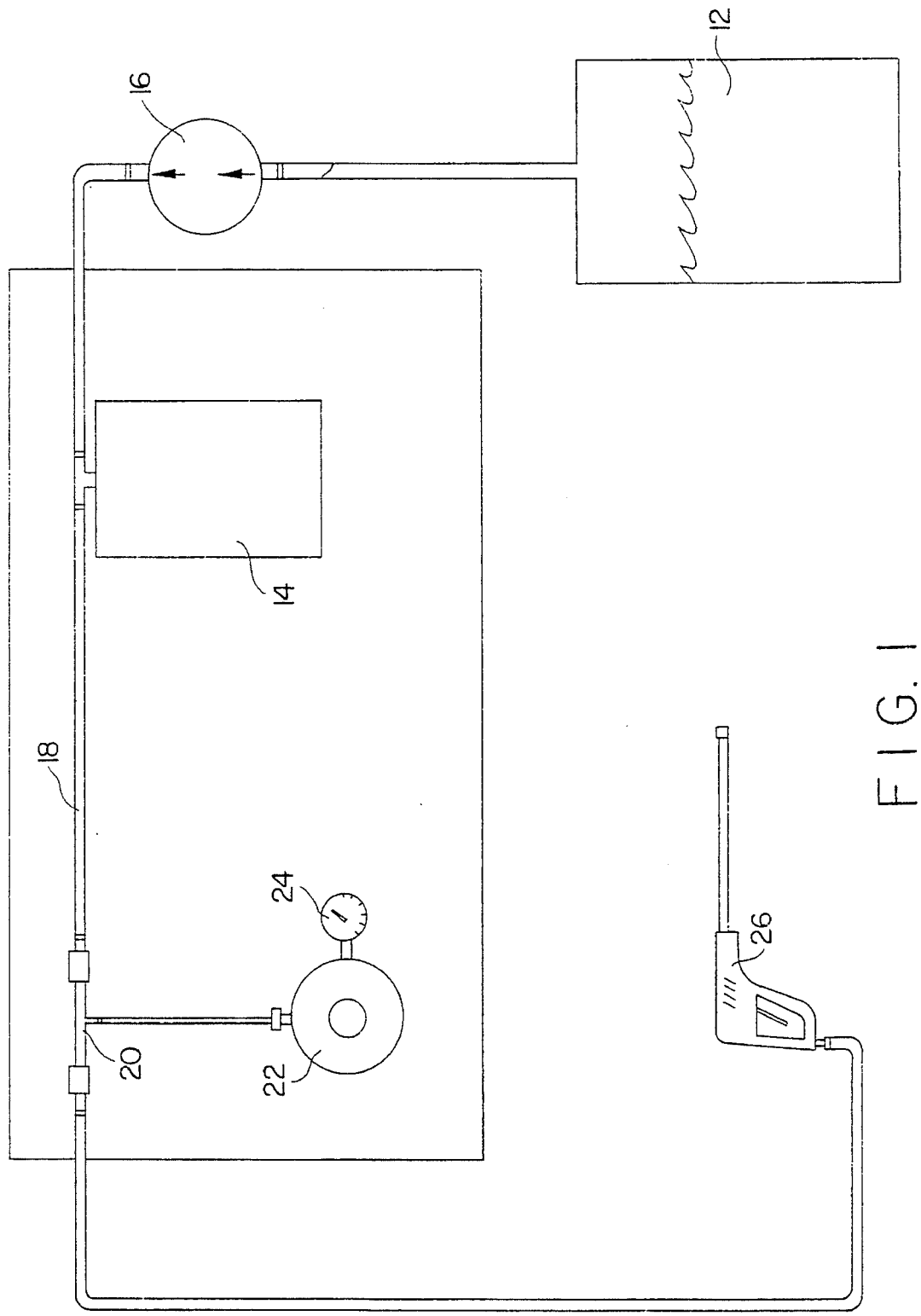
FIG. 1 shows a schematic diagram of a system for applying the release agent of the present invention.

This invention includes a novel asphalt release agent and a method for applying such a release agent to metal, rubber or other surfaces which come in contact with asphalt. Although the release agent of this invention is specifically designed for use with asphalt, it also has utility as a release agent for a variety of substances, including other hydrocarbon, plastic, rubber, aggregate or oil-based products.

Ideally, a release agent must be effective in preventing asphalt from sticking to any surface with which the asphalt comes in contact. The mechanism by which the release agent acts to achieve this goal is not important so long as the use of the release agent is environmentally sound, economical, and easily utilizable. Traditionally, the most commonly used release agents worked by "softening" or reducing the density of the asphalt which it contacted, thereby reducing sticking at the asphalt metal interface. This is the mechanism of action when diesel fuel is used as a release agent. As mentioned above, release agents that soften the asphalt are no longer considered desirable, and in most locations are actually prohibited by law. A release agent may also be a water-based surfactant that acts exclusively by making a "slippery" surface at the interface, without softening the asphalt.

According to the present invention, an asphalt release agent is taught having a fatty oil as the active ingredient, specifically an animal or vegetable oil. Such a release agent does not "soften" the asphalt, rather, it functions as a lubricant to reduce friction between the asphalt and the asphalt-contact surface. The release agent thus forms an oily film layer which prevents the asphalt from adhering to the surface.

Although the present invention exemplifies the use of the release agent for preventing asphaltic materials from sticking to transport vehicles and processing tools and equipment, this invention contemplates the use of the claimed release agent in a diverse range of applications. The release agent of the present invention provides an innocuous, slippery coating to any surface and thus has broad utility in a variety of applications including, without limitation, form release, plastic molds release, rubber molding release and foundries.

The active ingredient of the asphalt release agent of the present invention may be any "fatty oil" such as animal oil or vegetable oil or a combination thereof. The terms "fatty oil" and "oil" as used herein encompass purified or partially purified fats and oils including synthetic or naturally occurring glycerides or triglycerides of fatty acids. Constituent fatty acids include arachidic acid, caproic acid, caprylic acid, capric acid, lauric acid, linoleic acid, linolenic acid, myristic acid, oleic acid, palmitic acid, palmitolenic acid, stearic acid and stearates. Preferably, the active ingredient is a vegetable oil selected from the group consisting of soybean oil, castorseed oil, tung oil, linseed (flaxseed) oil, olive oil, sunflower oil, rapeseed oil, sesame oil, safflower oil, coconut (copra) oil, corn (maize) oil, cottonseed oil, palm oil and groundnut (peanut) oil. Suitable animal oils include butterfat, lard, tallow, bacon and fish and other marine oils. The present invention also contemplates the use of a mixture of two or more oils as the active ingredient. In the most preferred embodiment of the invention, the active ingredient is soybean oil.

According to this invention, the asphalt release agent contains from about 2 to about 98 percent by weight of the active ingredient oil, preferably between about 3 and about 60 percent, and most preferably between about 5 and about 25 percent.

For standard asphalt compositions, a most preferred embodiment of the asphalt release agent of this invention contains between about 5 and about 25 percent active ingredient. The exact amount of active ingredient is not critical, but it is desirable to use the minimum amount of active ingredient that is necessary to yield the desired release effects. The degree of release effect is directly proportional to the amount of active ingredient. For example, where the composition of the asphalt is such that there is still some sticking when using a standard active ingredient solution, the concentration of the active ingredient may be increased until adequate release action is shown. Such fine tuning to determine the optimal active ingredient concentration is very straightforward, and can be performed easily by one skilled in the art without undue experimentation. As will be understood by those of ordinary skill in the art, the optimum concentration may vary depending upon the type of asphaltic material, i.e., whether the material is crumb rubber, rubberized oil, polymerized oil, multi-blend oil, etc. Of course, for most applications of the product of this invention, the active ingredient concentration will be within the most preferred parameters and no fine-tuning is necessary.

The asphalt release agent of the present invention also comprises a surfactant or foaming agent. The surfactant functions predominantly—in conjunction with the preferred mode of application—to allow the release agent to be applied as a foam. Using a foam generally allows for the use of less release agent than when a non-foamed liquid is used. The foam also allows the person applying the release agent to better visualize where the material has been applied. And finally, when the release agent is diluted with water, the water content of the foamed material diminishes more rapidly than in the non-foam administration of the release agent. This rapid concentrating of the active ingredient enhances the effectiveness of the release agent. Using a foam also makes it easier for the release agent to adhere to vertical surfaces such as the sides of a truck bed.

Suitable surfactants are known to those skilled in the art and are readily available in commerce. The choice of a particular surfactant is not critical to the invention. A preferred class of surfactants for this invention are anionic surfactants. Surfactant blends containing anionic and nonionic compounds are also preferred. As exemplified herein, isopropylamine dodecylbenzene sulfonate is a particularly effective foaming agent.

The surfactant concentration generally depends on the particular surfactant or combination of surfactants and the concentration of the active ingredient. The surfactant concentration typically ranges from about 0.01 to about 20 percent, and preferably from about 0.1 to about 1.0 percent.

The asphalt release composition of the present invention preferably includes a diluent to reduce costs and facilitate uniform application of the release agent. Suitable diluents are known to those skilled in the art and are readily available in commerce. The choice of a particular diluent is not critical to the invention. Suitable diluents include conventional solvents such as water. The diluent concentration typically ranges from about 2.0 to about 98 percent, preferably from about 50 to about 90 percent, and most preferably from about 70 to about 80 percent.

A crosslinked copolymer, or an "associative thickener", or a combination of copolymers is preferably included in the composition to stabilize the emulsion when the hydrophobic active ingredient is mixed with a hydrophilic diluent such as water. Crosslinked copolymers include polycarboxylic acids or any copolymer that contains at least two hydrophobes, separated by a hydrophile. When a hydrophilic solvent such as water is the continuous phase, the hydrophobes associate with hydrophobes of neighboring molecules, creating a network. The resulting network extends throughout the solution or suspension, stabilizes the suspension, raises the viscosity, and thickens the solution. The stabilizing effect of the crosslinked copolymer is particularly pronounced when the composition is stored or applied at extreme temperatures. Crosslinked copolymers thus allow the releasing agent to be used even at extremely low or high ambient temperatures. Preferred copolymers include polycarboxylic acids, particularly copolymers of acrylic acid and carboxy polymethylene.

The copolymer concentration generally depends on the particular copolymer, the diluent used, and the concentration of the active ingredient. The copolymer concentration typically ranges from about 0.05 to about 10.0 percent, preferably from about 0.1 to about 5.0 percent, and more preferably from about 0.1 to about 3.0 percent. Suitable crosslinked copolymers are known to those skilled in the art and are readily available in commerce. The choice of a particular copolymer is not critical to the invention.

The asphalt release composition of the present invention preferably includes a preservative or antimicrobial agent such as sodium benzoate. The concentration of preservative depends upon the active ingredient concentration, but typically ranges from about 0.01 to about 3.0 percent, and preferably between about 0.1 and 1.0 percent.

The present invention also preferably includes an alkalinizing agent such as triethanolamine to activate the crosslinked copolymer and maximize emulsion stability. The alkalinizing agent also facilitates dispersion of the active ingredient throughout the continuous phase. Although the present invention is exemplified using triethanolamine, any alkalinizing agent such as alkanolamines, tertiary amines and hydroxides will work. The concentration of alkalinizing agent depends upon the active ingredient concentration, but typically ranges from about 0.01 to about 20 percent, preferably from about 0.5 to about 20 percent, and more preferably between about 0.1 and about 1.0 percent.

The release agent of the preferred embodiment comprises between about 70 and 95 percent water. The remaining 5 to 30 percent of the composition is predominantly vegetable oil, along with less than 1 percent each of surfactant or foaming agent, crosslinked copolymer or "associative thickener," sodium benzoate or other preservative and an alkalinizing agent such as triethanolamine. Of course, the precise proportions of the various chemicals is not critical.

A preferred embodiment of the release agent has roughly the following characteristics:

| | |
|---|---|
| Color | Milky white |
| Odor | Slight |
| Specific Gravity | 0.96–0.99 |
| Lbs per Gallon | 8.0–8.3 |
| Boiling Point °F. | 212° F. |
| Freezing Point °F. | 32° F. |

The release agent may be manufactured and stored as a concentrate of vegetable oil, foaming agent and crosslinked copolymer. The water to dilute to the appropriate concentration, preservative and alkalinizing agent can be added before shipping or at a local terminal. It is preferred that the dilution is not done on-site in order to maintain product consistency and to assure ease of use. In any event, the vegetable oil, foaming agent and crosslinked copolymer are mixed together until the composition is smooth with no lumps or granulation, usually 15–20 minutes at approximately 1700 rpm. An aqueous solution is prepared by combining the water, preservative and alkalinizing agent. This aqueous solution is then combined with the oil mixture and the composition is mixed until smooth and milky white. The pH of the oil/water suspension is adjusted to 4.0 with an acidifying agent such as hydrochloric acid.

According to the preferred method of the present invention, the novel asphalt release agent described herein is applied as a foam. The foam is produced on site by the use of widely available equipment which consists of means for injecting the liquid release agent solution with compressed air just prior to being forced through a nozzle. The presence of the surfactant in the release agent allows for the formation of the foam. Although the exact nature of the foam is not critical, the characteristics of the foam can easily be optimized by those skilled in the art by adjusting the concentration of the surfactant and/or the air pressure used in creating the foam.

FIG. 1 shows a system for applying the release agent. A storage tank 12 stores the release agent for use on an as-needed basis. A pump 14 draws the release agent out of the storage tank and through a filter 16 to filter out impurities. The release agent passes through a line 18 into an eductor 20. The eductor 20 draws pressurized air from an air compressor 22, the pressure of which can be monitored by an associated air pressure gage 24. After the pressurized air is injected into the release agent, it can be sprayed through a spray gun 26 onto a truck bed or other desired surface.

I claim:

1. An asphalt release agent foam comprising from about 3 to about 60 percent fatty oil, from about 0.01 to about 20 percent foaming agent, and the balance water.
2. The release agent foam of claim 1, wherein said fatty oil is a vegetable oil.
3. The release agent foam of claim 2, wherein said vegetable oil is selected from the group consisting of soybean oil, castorseed oil, tung oil, linseed oil, olive oil, sunflower oil, rapeseed oil, sesame oil, safflower oil, coconut oil, corn oil, cottonseed oil, palm oil and groundnut oil.
4. The release agent foam of claim 1, wherein said fatty oil is an animal oil.
5. The release agent foam of claim 4, wherein said animal oil is selected from the group consisting of butterfat, lard, tallow, and fish oil.
6. The release agent foam of claim 1, wherein said fatty oil is a mixture of glycerides or triglycerides of fatty acids.
7. The release agent foam of claim 1, wherein said foaming agent is an anionic surfactant.
8. The release agent foam of claim 7, wherein said anionic surfactant is isopropylamine dodecylbenzene sulfonate.
9. The release agent foam of claim 1, further comprising from about 0.05 to about 10.0 percent crosslinked copolymer having at least two hydrophobes separated by a hydrophile.
10. The release agent foam of claim 9, wherein said crosslinked copolymer comprises polycarboxylic acid.
11. The release agent foam of claim 9, wherein said copolymer comprises acrylic acid.
12. The release agent foam of claim 1, further comprising from about 0.01 to about 20.0 percent alkalinizing agent.
13. The release foam agent of claim 12, wherein said alkalinizing agent is selected from the group consisting of alkanolamines, tertiary amines and hydroxides.
14. The release agent foam of claim 12, wherein said alkalinizing agent is triethanolamine.
15. The release agent foam of claim 1, further comprising from about 0.01 to about 3.0 percent preservative.
16. The asphalt release agent foam of claim 1 further comprising:

0.1–5.0% crosslinked copolymer;

0.1–1.0% preservative; and 0.5–20% alkalinizing agent.

\* \* \* \* \*